United States Patent
Oguro et al.

(10) Patent No.: US 11,208,103 B2
(45) Date of Patent: Dec. 28, 2021

(54) VEHICLE CONTROL DEVICE

(71) Applicant: HONDA MOTOR CO., LTD., Tokyo (JP)

(72) Inventors: Hiroshi Oguro, Wako (JP); Daichi Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 154 days.

(21) Appl. No.: 16/616,065

(22) PCT Filed: May 24, 2017

(86) PCT No.: PCT/JP2017/019301
§ 371 (c)(1),
(2) Date: Nov. 22, 2019

(87) PCT Pub. No.: WO2018/216123
PCT Pub. Date: Nov. 29, 2018

(65) Prior Publication Data
US 2020/0086869 A1  Mar. 19, 2020

(51) Int. Cl.
| | | |
|---|---|---|
| B60W 20/00 | (2016.01) | |
| B60W 30/16 | (2020.01) | |
| B60W 10/04 | (2006.01) | |
| G05D 1/00 | (2006.01) | |

(52) U.S. Cl.
CPC .......... B60W 30/162 (2013.01); B60W 10/04 (2013.01); G05D 1/0088 (2013.01); *B60W 2554/801* (2020.02); *B60W 2554/804* (2020.02); *B60W 2720/106* (2013.01)

(58) Field of Classification Search
CPC .............. B60W 30/162; B60W 10/04; B60W 2554/804; B60W 2554/801; B60W 2720/106; G05D 1/0088
See application file for complete search history.

(56) References Cited

U.S. PATENT DOCUMENTS

| | | | | |
|---|---|---|---|---|
| 11,034,346 | B2* | 6/2021 | Shalev-Shwartz | .... B60W 30/09 |
| 2015/0175160 | A1* | 6/2015 | Sudou | .................. B60W 30/09 |
| 2015/0183433 | A1* | 7/2015 | Suzuki | .................. B60W 30/16 |
| 2016/0161271 | A1* | 6/2016 | Okumura | ............... G01C 21/34 |
| 2018/0281791 | A1* | 10/2018 | Fukaya | ................. B60W 30/16 |
| 2020/0094829 | A1* | 3/2020 | Ohmura | .............. B60W 30/165 |
| 2021/0269041 | A1* | 9/2021 | Ito | .................. B60W 30/18163 |

FOREIGN PATENT DOCUMENTS

| | | |
|---|---|---|
| JP | 05-104993 A | 4/1993 |
| JP | 2002-264688 A | 9/2002 |

OTHER PUBLICATIONS

PCT/ISA/210 from International Application PCT/JP2017/019301 with the English translation thereof.

* cited by examiner

*Primary Examiner* — Thomas G Black
*Assistant Examiner* — Brittany Renee Peko
(74) *Attorney, Agent, or Firm* — Carrier Blackman & Associates P.C.; Joseph P. Carrier; Jeffry T. Gadeon

(57) ABSTRACT

The present invention relates to a vehicle control device for automatically controlling at least a part of the drive control of the host vehicle. If an external condition detecting unit detects a first other vehicle subject to following control and a second other vehicle which exhibits the traveling movements of cutting in between the first other vehicle and the host vehicle, a deceleration limiter sets limits that differ depending on whether or not the relative speed of the host vehicle vis-a-vis the second other vehicle exceeds a speed threshold having a positive value.

6 Claims, 8 Drawing Sheets

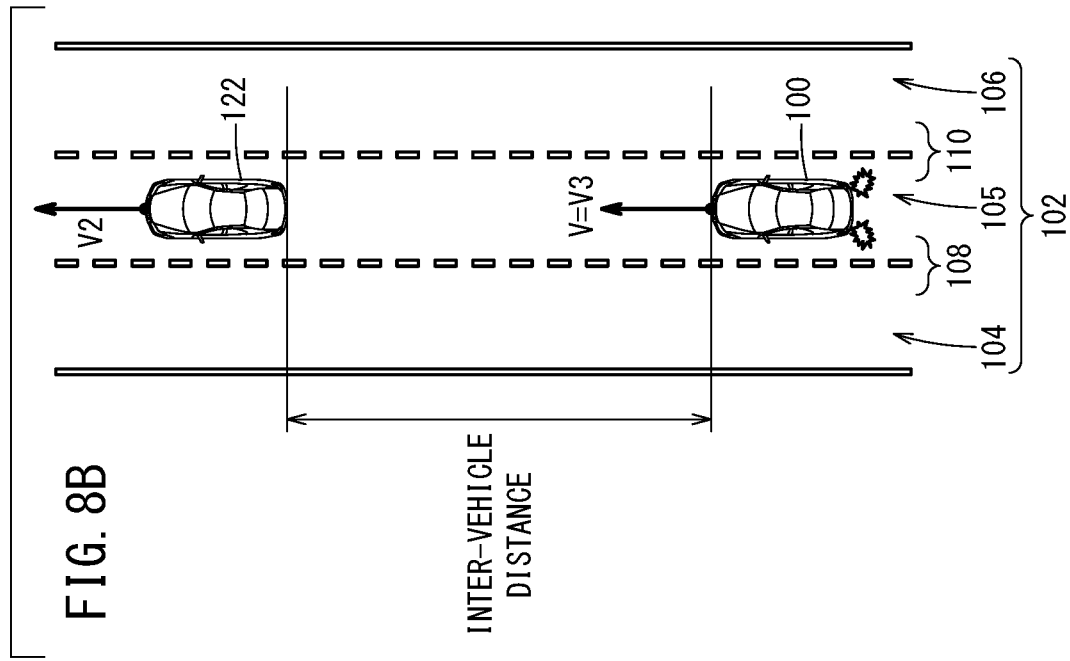
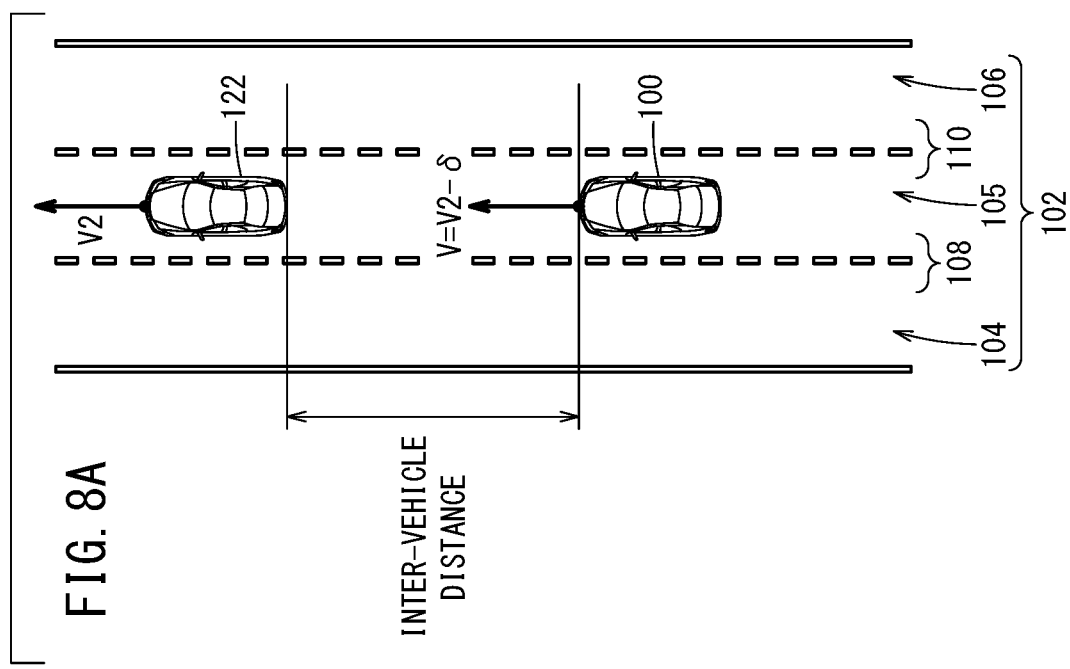

VEHICLE CONTROL DEVICE

TECHNICAL FIELD

The present invention relates to a vehicle control device that performs travel control of a host vehicle at least partially automatically.

BACKGROUND ART

A vehicle control device that performs travel control of a host vehicle at least partially automatically has conventionally been known. For example, various driving assistance techniques or automated driving techniques to cause the host vehicle to travel smoothly in consideration of relations with a plurality of other vehicles that precede the host vehicle have been developed.

Japanese Laid-Open Patent Publication No. 2002-264688 (paragraph [0011]) suggests a vehicle control device that, if an inter-vehicle distance for a preceding vehicle becomes less than or equal to a predetermined distance, sets the current inter-vehicle distance as a new target inter-vehicle distance automatically and continues following control. Thus, in this literature, the vehicle control device can prevent other vehicles from continuously cutting in front of a host vehicle and the host vehicle from decelerating more than necessary.

SUMMARY OF INVENTION

For example, in a case where the other vehicle (hereinafter, also referred to as cutting-in vehicle) tries to cut in between a following target vehicle and the host vehicle, if the cutting-in vehicle travels faster than the host vehicle, the host vehicle can deal with the cutting in without particular deceleration operation. Alternatively, even in a case where the cutting-in vehicle travels more slowly than the host vehicle, if the sufficient inter-vehicle distance can be secured, the host vehicle does not need to perform the particular deceleration operation.

However, in the device suggested in Japanese Laid-Open Patent Publication No. 2002-264688, regardless of travel behavior of the cutting-in vehicle, execution of temporary deceleration control is triggered by re-setting a shorter target inter-vehicle distance, and thus, the host vehicle may perform the unnecessary deceleration operation in some cases. As described above, there is sufficient room for improvement in the above device in view of convenience for driving.

The prevent invention has been made to solve the above problem, and an object thereof is to provide a vehicle control device that can perform following control suitable for travel behavior of a cutting-in vehicle.

A vehicle control device according to the present invention is a device that performs travel control of a host vehicle at least partially automatically, the device including: an external environment state detection unit configured to detect a state of an external environment of the host vehicle; a travel control unit configured to perform following control with respect to another vehicle that is detected ahead of the host vehicle by the external environment state detection unit; and a deceleration limit unit configured to limit deceleration of the host vehicle while the travel control unit performs the following control, wherein if the external environment state detection unit has detected a first other vehicle that is an object of the following control and a second other vehicle that exhibits travel behavior of cutting in between the first other vehicle and the host vehicle, the deceleration limit unit limits the deceleration differently depending on whether relative speed of the host vehicle with respect to the second other vehicle exceeds a speed threshold that is a positive value.

As described above, if the second other vehicle exhibits the travel behavior of cutting in between the first other vehicle and the host vehicle, the deceleration is limited differently depending on whether the relative speed of the host vehicle with respect to the second other vehicle exceeds the speed threshold that is the positive value. Therefore, in a case where an inter-vehicle distance for the second other vehicle becomes shorter gradually, the following control suitable for the travel behavior of the second other vehicle (that is, cutting-in vehicle) can be performed.

If the relative speed does not exceed the speed threshold, the deceleration limit unit may determine an upper limit value of the deceleration by using at least time-to-contact of the host vehicle with respect to the second other vehicle, and if the relative speed exceeds the speed threshold, the deceleration limit unit may determine the upper limit value of the deceleration by using at least an inter-vehicle distance between the second other vehicle and the host vehicle.

If the relative speed does not exceed the speed threshold, the upper limit value to be determined by the deceleration limit unit may become relatively larger as the time-to-contact becomes shorter, and may become relatively smaller as the time-to-contact becomes longer. Therefore, in a case where the contact with the second other vehicle needs to be avoided, operation of large deceleration can be allowed, whereas in a case where there is a sufficient time before the contact with the second other vehicle, the unnecessary sudden deceleration operation can be suppressed.

If the relative speed does not exceed the speed threshold and the time-to-contact exceeds a time threshold, the deceleration limit unit may determine, as the upper limit value, a designed value of the deceleration where the relative speed becomes a predetermined negative value at a time point when estimated time has elapsed. In a situation where the change of the inter-vehicle distance for the second other vehicle is relatively small and the time-to-contact is relatively long, deceleration control can be performed smoothly in accordance with the speed of the second other vehicle.

If the relative speed is a zero value or a negative value, the deceleration limit unit may determine the zero value as the upper limit value of the deceleration. Thus, in a situation where the inter-vehicle distance for the second other vehicle becomes longer gradually, the following control in which the host vehicle is not decelerated can be performed.

By the vehicle control device according to the present invention, the following control suitable for the travel behavior of the cutting-in vehicle can be performed.

BRIEF DESCRIPTION OF DRAWINGS

FIG. 8A illustrates travel behavior of the host vehicle in a situation of cutting-in in a range Ra (FIG. 6); and FIG. 8B illustrates the travel behavior of the host vehicle in the situation of the cutting-in in a range Rd (FIG. 6).

DESCRIPTION OF EMBODIMENT

A preferred embodiment of a vehicle control device according to the present invention will be described below with reference to the attached drawings.

[Configuration of Vehicle Control Device 10]

<Overall Configuration>

Figure 1:
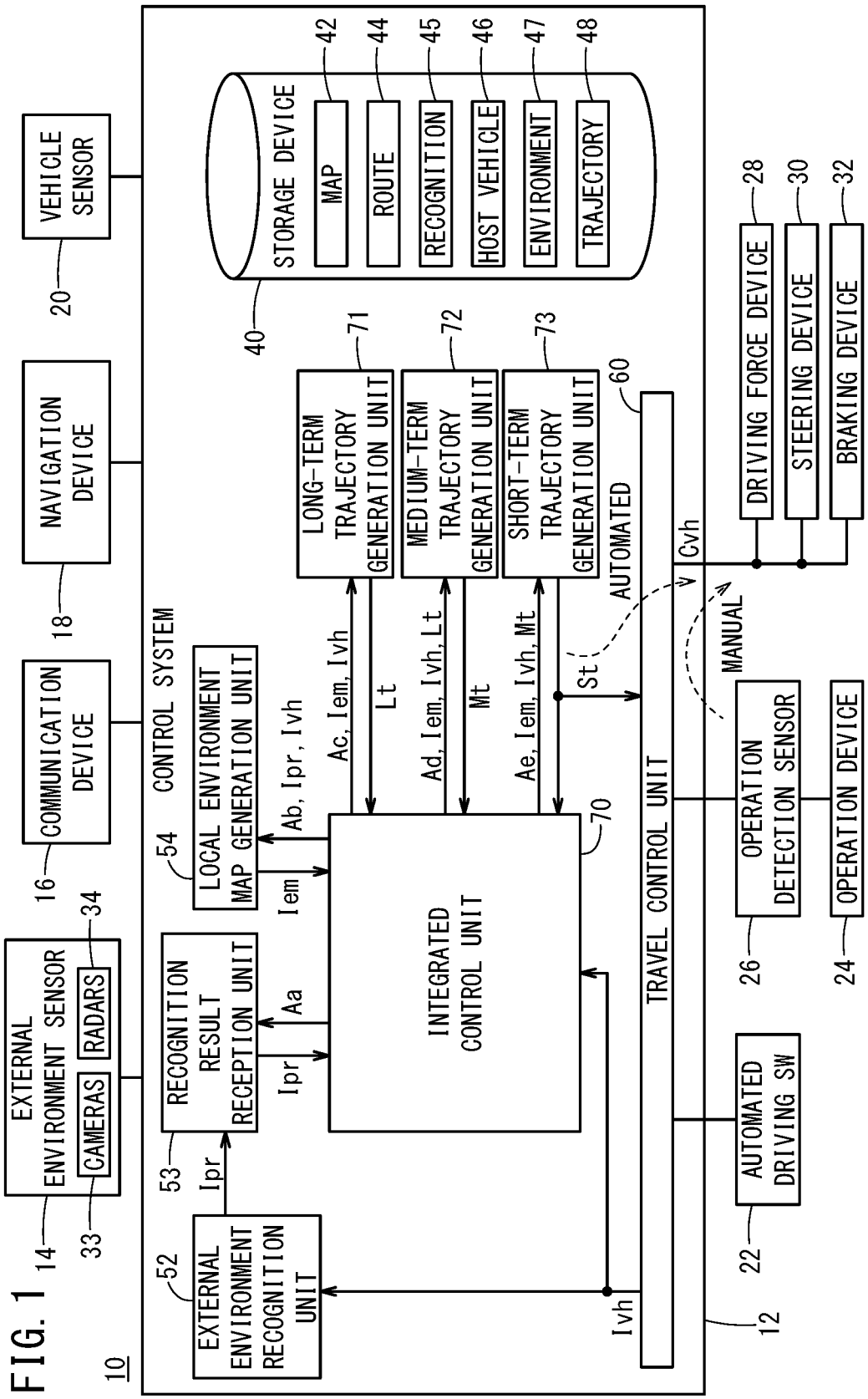
FIG. 1 is a block diagram that illustrates a configuration of a vehicle control device according to one embodiment of the present invention.

FIG. 1 is a block diagram that illustrates a configuration of a vehicle control device 10 according to one embodiment of the present invention. The vehicle control device 10 is incorporated into a vehicle (host vehicle 100 in FIG. 5), and performs travel control of the vehicle automatically or manually. This "automated driving" refers to a concept including not only "fully automated driving" in which the travel control of the vehicle is fully automated but also "partial automated driving" (or driving assistance) in which the travel control is partially automated.

The vehicle control device 10 basically includes an input system device group, a control system 12, and an output system device group. Devices in the input system device group and the output system device group are connected to the control system 12 through communication lines.

The input system device group includes an external environment sensor 14, a communication device 16, a navigation device 18, a vehicle sensor 20, an automated driving switch 22, and an operation detection sensor 26 that is connected to an operation device 24. The output system device group includes a driving force device 28 to drive wheels, a steering device 30 to steer the wheels, and a braking device 32 to brake the wheels.

<Specific Configuration of Input System Device Group>

The external environment sensor 14 includes a plurality of cameras 33 and a plurality of radars 34 that acquire information indicating a state of an external environment of the vehicle (hereinafter, external environment information), and outputs the acquired external environment information to the control system 12. The external environment sensor 14 may further include a plurality of LIDAR (Light Detection and Ranging/Laser Imaging Detection and Ranging) devices.

The communication device 16 is configured to be capable of communicating with external devices including road side machines, other vehicles, and a server, and transmits and receives, for example, information regarding traffic equipment, information regarding the other vehicle, probe information, or the latest map information. Note that the map information is stored in the navigation device 18 and also stored as map information in a map information storage unit 42 of a storage device 40.

The navigation device 18 includes a satellite positioning device that can detect the current position of the vehicle, and a user interface (for example, touch panel type display, speaker, and microphone). The navigation device 18 calculates a route to a designated destination on the basis of the current position of the vehicle or a position designated by a user, and outputs the calculated route to the control system 12. The route calculated by the navigation device 18 is stored in a route information storage unit 44 of the storage device 40 as route information.

The vehicle sensor 20 includes a speed sensor that detects the speed (vehicle speed) of the vehicle, a so-called longitudinal acceleration sensor that detects longitudinal acceleration, a so-called lateral acceleration sensor that detects lateral acceleration, a yaw rate sensor that detects angular velocity around a vertical axis, an azimuth sensor that detects an orientation/azimuth, and an inclination sensor that detects inclination, and outputs detection signals from the respective sensors to the control system 12. These detection signals are stored in a host vehicle state information storage unit 46 of the storage device 40 as host vehicle state information Ivh.

The operation device 24 includes an accelerator pedal, a steering wheel, a brake pedal, a shift lever, and a direction indicating lever. The operation device 24 is provided with the operation detection sensor 26 that detects the presence or absence of an operation made by a driver, the operation amount, or the operation position.

The operation detection sensor 26 outputs, to a travel control unit 60, the accelerator depression amount (accelerator opening degree), the steering wheel operation amount (steering amount), the brake pedal depression amount, a shift position, a right/left turning direction, or the like as a detection result.

The automated driving switch 22 is a hardware switch or a software switch, and can switch a plurality of driving modes including "automated driving mode" and "manual driving mode" by a manual operation of the user.

The automated driving mode is a driving mode in which the vehicle travels under control by the control system 12 in a state where the driver does not operate the operation device 24 (specifically, the accelerator pedal, the steering wheel, and the brake pedal). In other words, the automated driving mode is a driving mode in which the control system 12 controls a portion or all of the driving force device 28, the steering device 30, and the braking device 32 on the basis of an action plan (in the short term, short-term trajectory St which will be described below) that is determined successively.

Note that if the driver starts to operate the operation device 24 in the automated driving mode, the automated driving mode is canceled automatically and switched to the driving mode whose driving automation level is relatively low (including manual driving mode).

<Specific Configuration of Output System Device Group>

The driving force device 28 includes a driving force control ECU (Electronic Control Unit) and a driving source including an engine/traction motor. The driving force device 28 generates travel driving force (torque) by which the vehicle travels in accordance with a vehicle control value Cvh that is input from the travel control unit 60, and transmits the travel driving force to the wheels directly or through a transmission.

The steering device 30 includes an EPS (electric power steering system) ECU and an EPS device. The steering device 30 changes the orientation of the wheels (steering wheels) in accordance with the vehicle control value Cvh that is input from the travel control unit 60.

The braking device 32 is, for example, an electric servo brake that is used in combination with a hydraulic brake, and includes a braking force control ECU and a brake actuator. The braking device 32 brakes the wheels in accordance with the vehicle control value Cvh that is input from the travel control unit 60.

<Configuration of Control System 12>

A function realization unit of the control system 12 is a software function unit that realizes a function when one or a plurality of CPUs (Central Processing Units) execute programs stored in a non-transitory storage medium (for example, storage device 40). The function realization unit may alternatively be a hardware function unit including an integrated circuit such as an FPGA (Field-Programmable Gate Array).

The control system 12 includes, in addition to the storage device 40 and the travel control unit 60, an external environment recognition unit 52, a recognition result reception unit 53, a local environment map generation unit 54, an integrated control unit 70, a long-term trajectory generation unit 71, a medium-term trajectory generation unit 72, and a short-term trajectory generation unit 73. Here, the integrated control unit 70 controls synchronization of tasks of the recognition result reception unit 53, the local environment map generation unit 54, the long-term trajectory generation unit 71, the medium-term trajectory generation unit 72, and the short-term trajectory generation unit 73 so as to comprehensively control the units.

The external environment recognition unit 52 refers to the host vehicle state information Ivh from the travel control unit 60, recognizes marks such as a lane marking, a stop line, and a traffic signal on the basis of various pieces of information input from the input system device group (such as external environment information from the external environment sensor 14), and then, generates "static" external environment recognition information including positional information about the mark or a travel possible area of the vehicle. In addition, the external environment recognition unit 52 generates "dynamic" external environment recognition information including an obstacle such as a parked or stopped vehicle, a traffic participant such as a person or another vehicle, or the color of the traffic signal, by using various pieces of input information.

Note that each piece of the static and dynamic external environment recognition information is stored as external environment recognition information Ipr in an external environment recognition information storage unit 45 of the storage device 40.

In response to a calculation command Aa, the recognition result reception unit 53 outputs, to the integrated control unit 70, the external environment recognition information Ipr received within a predetermined calculation cycle Toc together with a count value of an update counter. Here, the calculation cycle Toc is a reference calculation cycle in the control system 12, and is set to a value of about several tens of milliseconds, for example.

In response to a calculation command Ab from the integrated control unit 70, the local environment map generation unit 54 refers to the host vehicle state information Ivh and the external environment recognition information Ipr, generates local environment map information Iem within the calculation cycle Toc, and outputs, to the integrated control unit 70, the local environment map information Iem together with the count value of the update counter. That is to say, when the control is started, the calculation cycle 2×Toc is required until the local environment map information Iem is generated.

The local environment map information Iem is information in which a travel environment of the vehicle is mapped, and is generally obtained by combining the host vehicle state information Ivh and an ideal travel route with the external environment recognition information Ipr. The local environment map information Iem is stored in a local environment map information storage unit 47 of the storage device 40.

In response to a calculation command Ac from the integrated control unit 70, the long-term trajectory generation unit 71 refers to the local environment map information Iem (only a static component of the external environment recognition information Ipr is used), the host vehicle state information Ivh, and a road map stored in the map information storage unit 42 (curvature of curve or the like), and generates a long-term trajectory Lt in the relatively longest calculation cycle (for example, 9×Toc). Then, the long-term trajectory generation unit 71 outputs, to the integrated control unit 70, the generated long-term trajectory Lt together with the count value of the update counter. Note that the long-term trajectory Lt is stored as trajectory information Ir in a trajectory information storage unit 48 of the storage device 40.

In response to a calculation command Ad from the integrated control unit 70, the medium-term trajectory generation unit 72 refers to the local environment map information Iem (both dynamic and static components of the external environment recognition information Ipr are used), the host vehicle state information Ivh, and the long-term trajectory Lt, and generates a medium-term trajectory Mt in a relatively medium calculation cycle (for example, 3×Toc). Then, the medium-term trajectory generation unit 72 outputs, to the integrated control unit 70, the generated medium-term trajectory Mt together with the count value of the update counter. Note that the medium-term trajectory Mt is stored in the trajectory information storage unit 48 of the storage device 40 as the trajectory information Ir similarly to the long-term trajectory Lt.

In response to a calculation command Ae from the integrated control unit 70, the short-term trajectory generation unit 73 refers to the local environment map information Iem (both dynamic and static components of the external environment recognition information Ipr are used), the host vehicle state information Ivh, and the medium-term trajectory Mt, and generates the short-term trajectory St in the relatively shortest calculation cycle (for example, Toc). Then, the short-term trajectory generation unit 73 simultaneously outputs, to the integrated control unit 70 and the travel control unit 60, the generated short-term trajectory St together with the count value of the update counter. Note that the short-term trajectory St is stored in the trajectory information storage unit 48 as the trajectory information Ir similarly to the long-term trajectory Lt and the medium-term trajectory Mt.

Note that the long-term trajectory Lt indicates a trajectory in a travel time of about 10 seconds, for example, and is a trajectory in which riding comfort and comfortability are prioritized. The short-term trajectory St indicates a trajectory in a travel time of about one second, for example, and is a trajectory in which achievement of vehicle dynamics and high safety is prioritized. The medium-term trajectory Mt indicates a trajectory in a travel time of about five seconds, for example, and is an intermediate trajectory between the long-term trajectory Lt and the short-term trajectory St.

The short-term trajectory St corresponds to a data set that indicates a travel trajectory of the vehicle (that is, a time series of target behavior) in each short cycle Ts (=Toc). The short-term trajectory St is a trajectory plot (x, y, θz, V, G, ρ, γ, δst) in which data units are, for example, a position x in a longitudinal direction (X axis), a position y in a lateral direction (Y axis), an attitude angle θz (yaw angle), speed V, acceleration G, curvature ρ, a yaw rate γ, and a steering angle δst. The long-term trajectory Lt and the medium-term trajectory Mt, which have different cycles, are data sets that are defined similarly to the short-term trajectory St.

The travel control unit 60 determines each vehicle control value Cvh to control the travel of the vehicle in accordance with travel behavior (a time series of target behavior) that is specified by the short-term trajectory St. Then, the travel control unit 60 outputs each obtained vehicle control value Cvh to the driving force device 28, the steering device 30, and the braking device 32. That is to say, the travel control unit 60 is configured to be capable of performing one or more kinds of travel control corresponding to each value of the short-term trajectory St.

The kinds of travel control include, for example, following control, specifically, ACC (Adaptive Cruise Control) control. This "ACC control" is travel control in which the vehicle is controlled to travel so as to follow a preceding vehicle while keeping an inter-vehicle distance substantially constant (that is, target inter-vehicle distance).

<Main Characteristic Units>

Figure 2:
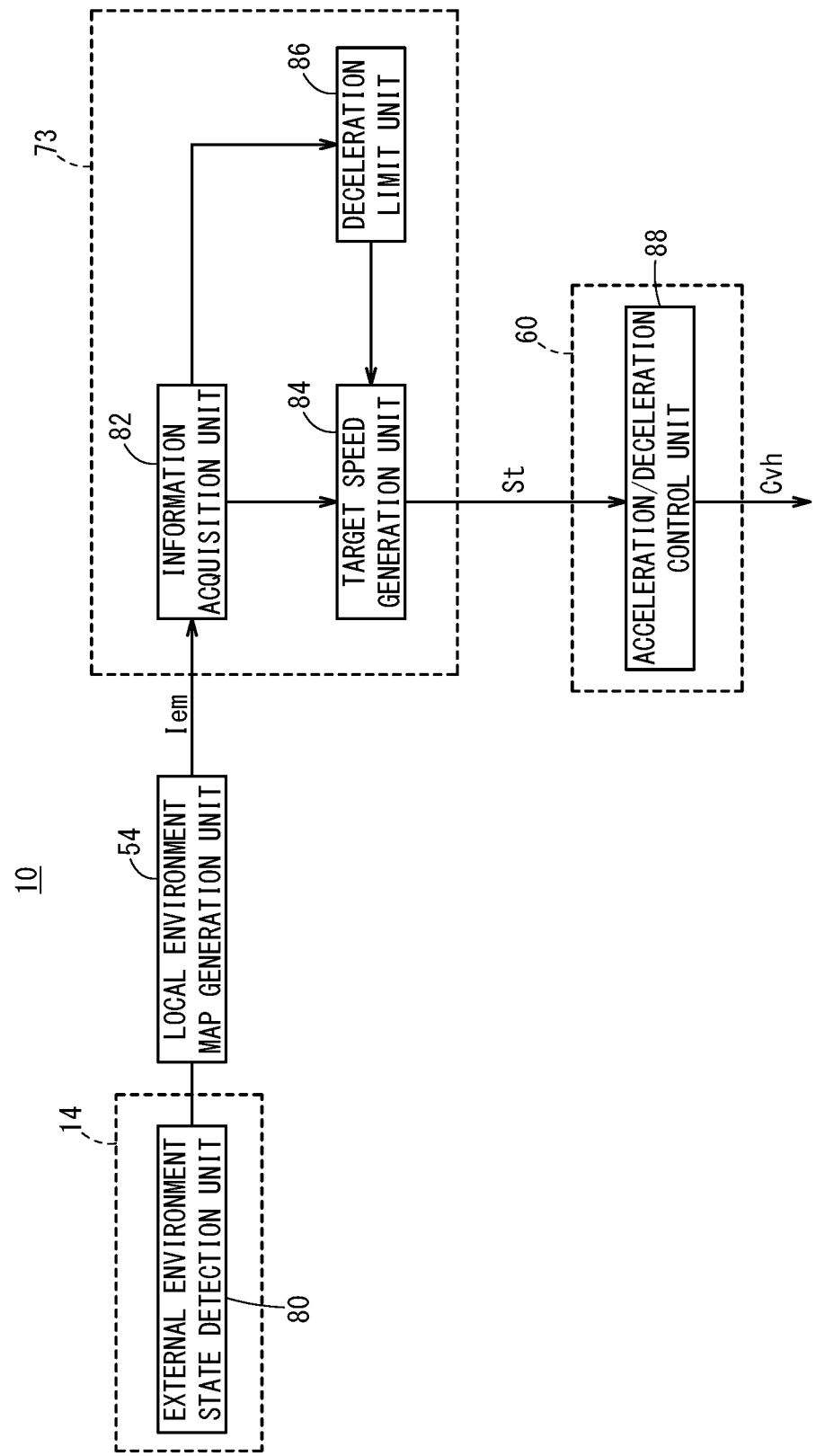
FIG. 2 is a function block diagram that illustrates main characteristic units in the vehicle control device in FIG. 1.

FIG. 2 is a function block diagram that illustrates main characteristic units in the vehicle control device 10 in FIG. 1. The vehicle control device 10 includes, in addition to the local environment map generation unit 54 (FIG. 1), an external environment state detection unit 80, an information acquisition unit 82, a target speed generation unit 84, a deceleration limit unit 86, and an acceleration/deceleration control unit 88.

The external environment state detection unit 80 corresponds to the external environment sensor 14 illustrated in FIG. 1. The information acquisition unit 82, the target speed generation unit 84, and the deceleration limit unit 86 correspond to the short-term trajectory generation unit 73 illustrated in FIG. 1. The acceleration/deceleration control unit 88 corresponds to the travel control unit 60 illustrated in FIG. 1.

Figure 5:
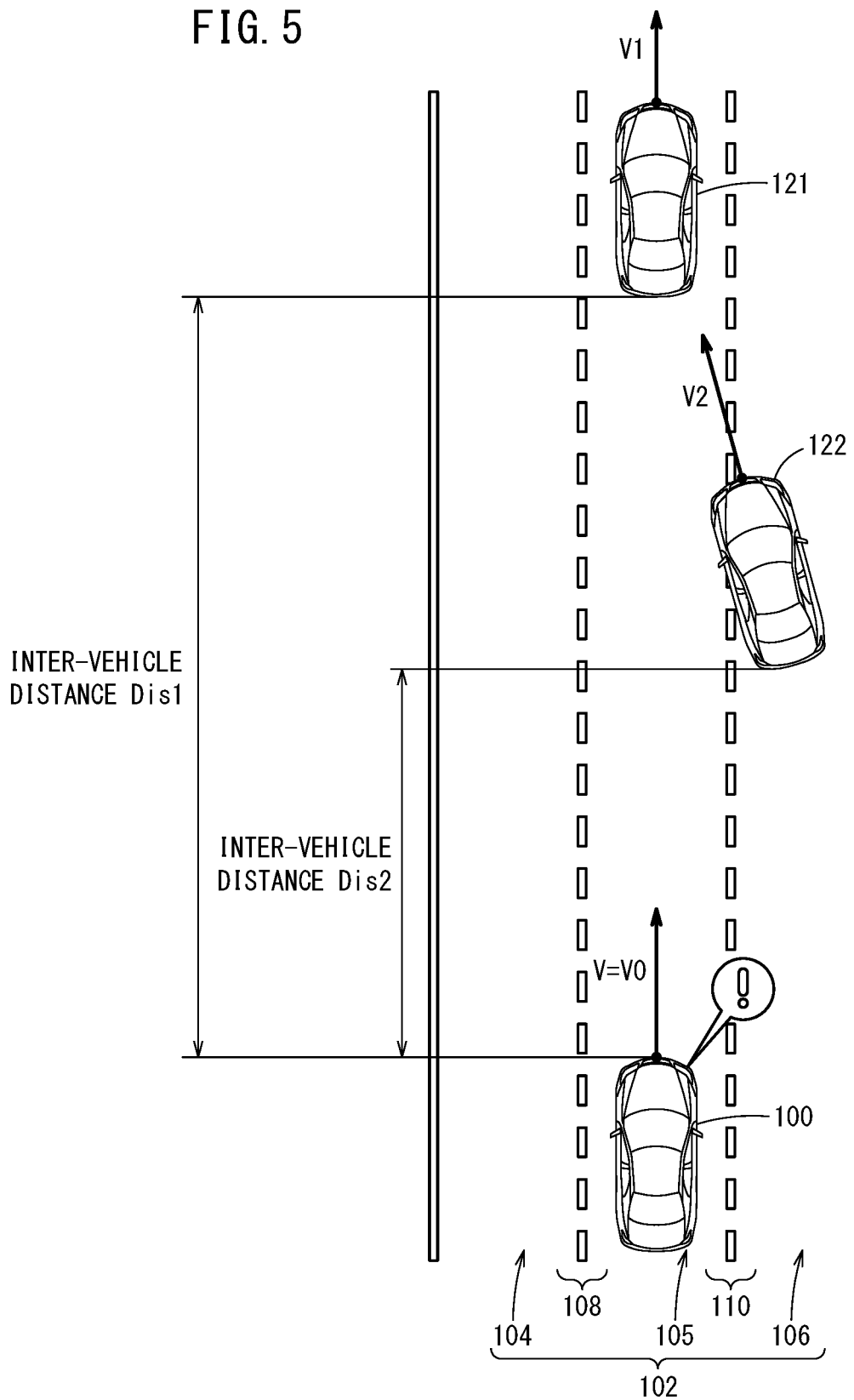
FIG. 5 illustrates a positional relation among a host vehicle and two other vehicles.

The external environment state detection unit 80 (specifically, the cameras 33 or radars 34 in FIG. 1) detects the state of the external environment of the host vehicle 100 (FIG. 5). For example, by using the cameras 33, captured images including a road 102 (FIG. 5) where the host vehicle 100 is traveling can be obtained.

The information acquisition unit 82 acquires various pieces of information used for generating the short-term trajectory St, from the local environment map information Iem including a detection result from the external environment state detection unit 80. For example, this information includes, in addition to the host vehicle state information Ivh described above, lane marking information that can specify the shape of the lane marking (lane markings 108, 110 in FIG. 5) and other vehicle information that can specify the position and the movement of the other vehicle (a first other vehicle 121, a second other vehicle 122 in FIG. 5).

The target speed generation unit 84 generates the short-term trajectory St that indicates a time series pattern of the target speed by using various pieces of information acquired by the information acquisition unit 82. The deceleration limit unit 86 sets a time series pattern of speed limit (hereinafter, speed limit pattern) by using various pieces of information acquired by the information acquisition unit 82, and outputs the time series pattern to the target speed generation unit 84. That is to say, the deceleration limit unit 86 limits the deceleration of the host vehicle 100 by reflecting the speed limit in the generation of the short-term trajectory St.

The acceleration/deceleration control unit 88 performs acceleration control or deceleration control for the host vehicle 100 in accordance with the target speed generated by the target speed generation unit 84. Specifically, the acceleration/deceleration control unit 88 outputs a speed pattern (vehicle control value Cvh) shown by the short-term trajectory St to the driving force device 28 or the braking device 32.

<Detailed Block Diagram of Target Speed Generation Unit 84>

Figure 3:
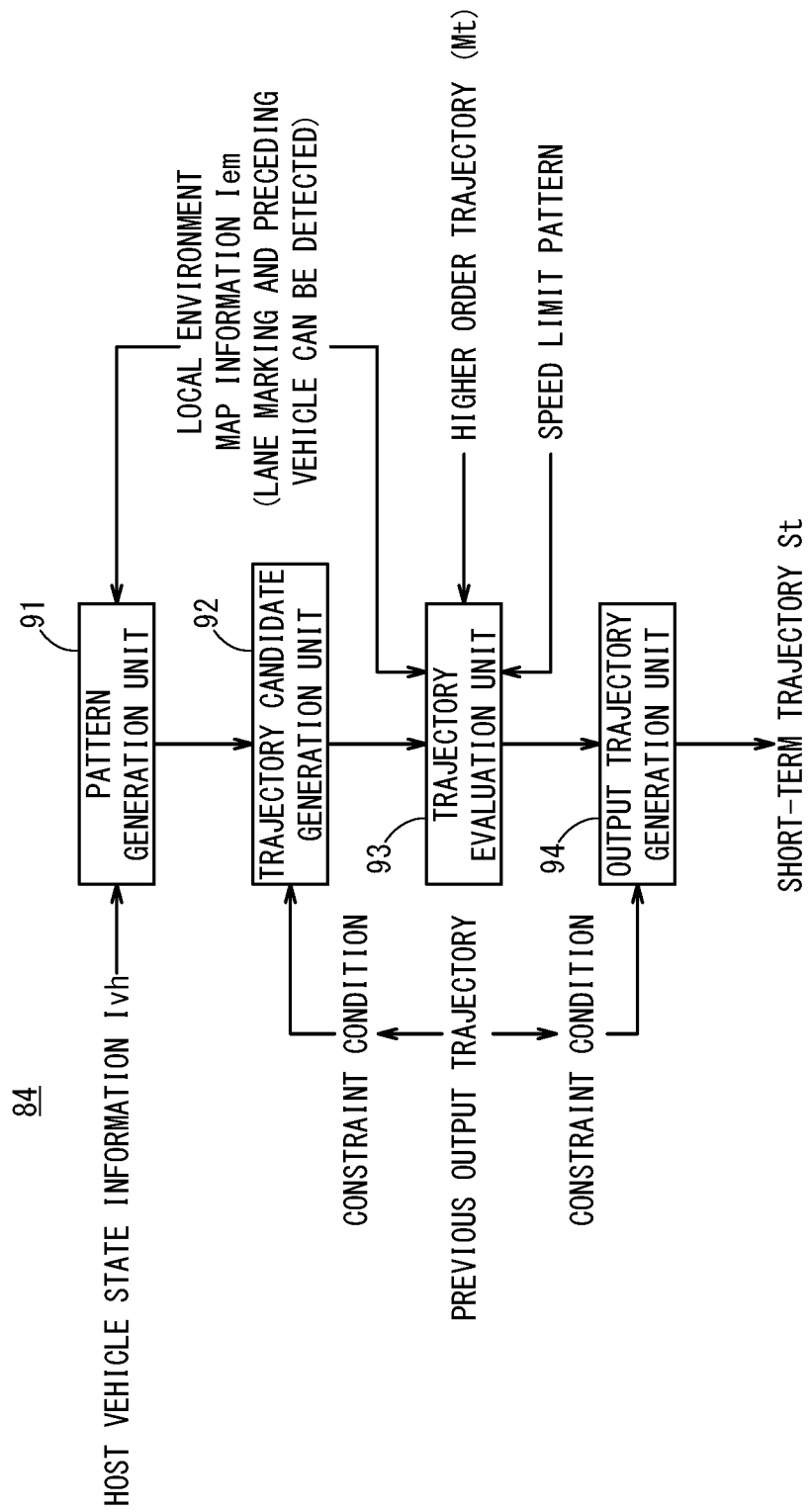
FIG. 3 is a detailed block diagram of a target speed generation unit in FIG. 2.

FIG. 3 is a detailed block diagram of the target speed generation unit 84 in FIG. 2. The target speed generation unit 84 includes a pattern generation unit 91, a trajectory candidate generation unit 92, a trajectory evaluation unit 93, and an output trajectory generation unit 94.

The pattern generation unit 91 generates a variation group regarding two kinds of patterns used for generating the short-term trajectory St, by using the host vehicle state information Ivh and the local environment map information Iem. Specifically, the pattern generation unit 91 generates respective variation groups regarding [1] the speed pattern (longitudinal pattern) indicating a time series of the speed V and [2] a steering angle pattern (lateral pattern) indicating a time series of the steering angle δst.

The trajectory candidate generation unit 92 generates candidates of the short-term trajectory St (hereinafter, simply referred to as "trajectory candidates") by using the variation group of the pattern generated by the pattern generation unit 91. Specifically, by combining the speed pattern and the steering angle pattern, the trajectory candidate generation unit 92 generates a number of trajectory candidates each including time series information about a two-dimensional position (x, y). Note that if the short-term trajectory St that is recently generated (hereinafter, previous output trajectory) is present, a constraint condition may be set in order to ensure compatibility with the previous output trajectory.

The trajectory evaluation unit 93 performs an evaluation process in accordance with predetermined evaluation criteria for each of the trajectory candidates generated by the trajectory candidate generation unit 92. For the evaluation criteria, the local environment map information Iem (including detection results regarding the lane marking and other vehicle) and a higher order trajectory (medium-term trajectory Mt) are referred to. Note that the trajectory evaluation unit 93 can refer to the speed limit pattern set by the deceleration limit unit 86 (FIG. 2), and change the evaluation criteria so that the host vehicle 100 travels at the speed lower than the speed limit.

Examples of an evaluation method include a method for calculating a deviation between one or more variables that form the trajectory plot (x, y, θz, V, G, ρ, γ, δst) and a target value (reference value), scoring this deviation, and calculating a total score by weighting calculation. For example, by relatively increasing a weight coefficient corresponding to a particular parameter, an evaluation result in which the particular parameter is emphasized can be obtained.

<Detailed Block Diagram of Deceleration Limit Unit 86>

Figure 4:
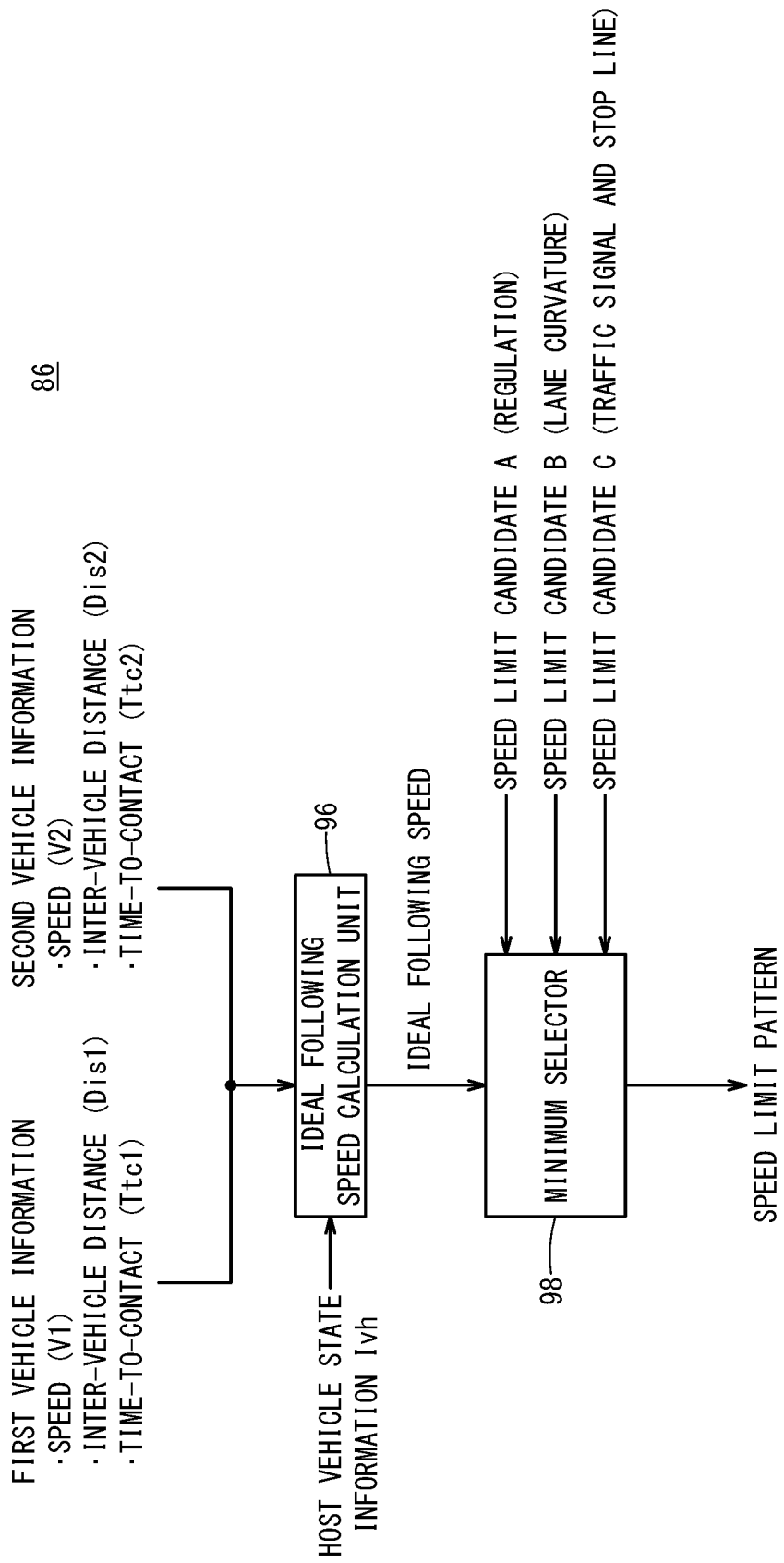
FIG. 4 is a detailed block diagram of a deceleration limit unit in FIG. 2.

FIG. 4 is a detailed block diagram of the deceleration limit unit 86 in FIG. 2. The deceleration limit unit 86 includes an ideal following speed calculation unit 96 and a minimum selector 98.

The ideal following speed calculation unit 96 calculates an ideal speed pattern (hereinafter, referred to as ideal following speed) for the purpose of following the first other vehicle 121, by using vehicle information about the first other vehicle 121 (hereinafter, first vehicle information) in addition to the host vehicle state information Ivh. This vehicle information includes the speed (absolute speed), the inter-vehicle distance for the host vehicle 100, or TTC (Time-To-Contact/Time-To-Collision).

Note that if the second other vehicle 122 is detected at the same time as the first other vehicle 121, the ideal following speed calculation unit 96 calculates the ideal following speed for the first other vehicle 121 or the second other vehicle 122 by further using vehicle information about the second other vehicle 122 (hereinafter, second vehicle information).

The minimum selector 98 selects the minimum speed from the ideal following speed calculated by the ideal following speed calculation unit 96 and three speed limit candidates A, B, C, and outputs the selected speed as the speed limit pattern. The speed limit candidate A is an upper limit value of the speed based on the regulations or the like (what is called legal speed limit). The speed limit candidate B is an upper limit value of the speed for securing the stable travel behavior, and is calculated based on lane curvature. The speed limit candidate C is an upper limit value of the speed at which the vehicle can stop at a predetermined stop position, and is calculated based on the lighting state of the traffic signal and the stop line.

[Operation of Vehicle Control Device 10]

The vehicle control device 10 according to the present embodiment is configured as above. Next, operation of the vehicle control device 10 is described with reference to FIG. 5 to FIG. 8B.

FIG. 5 illustrates a positional relation among the host vehicle 100 and the two other vehicles. The host vehicle 100 travels on the road 102 that has an approximately straight shape and includes three lanes on one side. On the road 102, lane markings 108, 110 to section lanes 104, 105, 106 are drawn with broken lines.

As shown in this drawing, the two other vehicles precede the host vehicle 100 and travel on the same road 102. The other vehicle that travels on the lane 105 (travel lane) where the host vehicle 100 exists is referred to as "first other vehicle 121". The other vehicle that travels on the lane 106 where the host vehicle 100 does not exit is referred to as "second other vehicle 122". Here, it is assumed that the travel control unit 60 is performing the following control for the first other vehicle 121 that precedes the host vehicle 100.

<STEP 1. Detection Step>

Firstly, the external environment state detection unit 80 detects the lane markings 108, 110 as stationary objects around the host vehicle 100, and detects the first other vehicle 121 and the second other vehicle 122 as moving objects around the host vehicle 100.

In the example in FIG. 5, the speed V of the host vehicle 100 is V0, the speed of the first other vehicle 121 is V1, and the speed of the second other vehicle 122 is V2. On the basis of the host vehicle 100, the inter-vehicle distance for the first other vehicle 121 is Dis1, and the inter-vehicle distance for the second other vehicle 122 is Dis2 (<Dis1). On the basis of the host vehicle 100, the time-to-contact for the first other vehicle 121 is Ttc1, and the time-to-contact for the second other vehicle 122 is Ttc2.

As shown by solid-line arrows, while both the host vehicle 100 and the first other vehicle 121 intend to travel straight in the lane 105, the second other vehicle 122 tries to change the lane from the lane 106 where the second other vehicle 122 is traveling to the next lane 105. That is to say, the second other vehicle 122 exhibits the travel behavior of cutting in between the first other vehicle 121 and the host vehicle 100 when the host vehicle 100 is in following traveling.

Note that this travel behavior of "cutting-in" can be detected based on not only the movement direction of the second other vehicle 122 but also a positional relation with the lane marking 110 (specifically, whether the second other vehicle 122 has crossed the lane marking 110), for example.

<STEP 2. Limiting Step>

Secondly, if the first other vehicle 121 and the second other vehicle 122 illustrated in FIG. 5 are detected, the deceleration limit unit 86 limits the deceleration of the host vehicle 100 in accordance with relative speed $\Delta V$ between the host vehicle 100 and the second other vehicle 122. Note that if the host vehicle 100 is relatively faster, the value of the relative speed $\Delta V = V0 - V2$ is positive. On the other hand, if the second other vehicle 122 is relatively faster, the value is negative.

Figure 6:
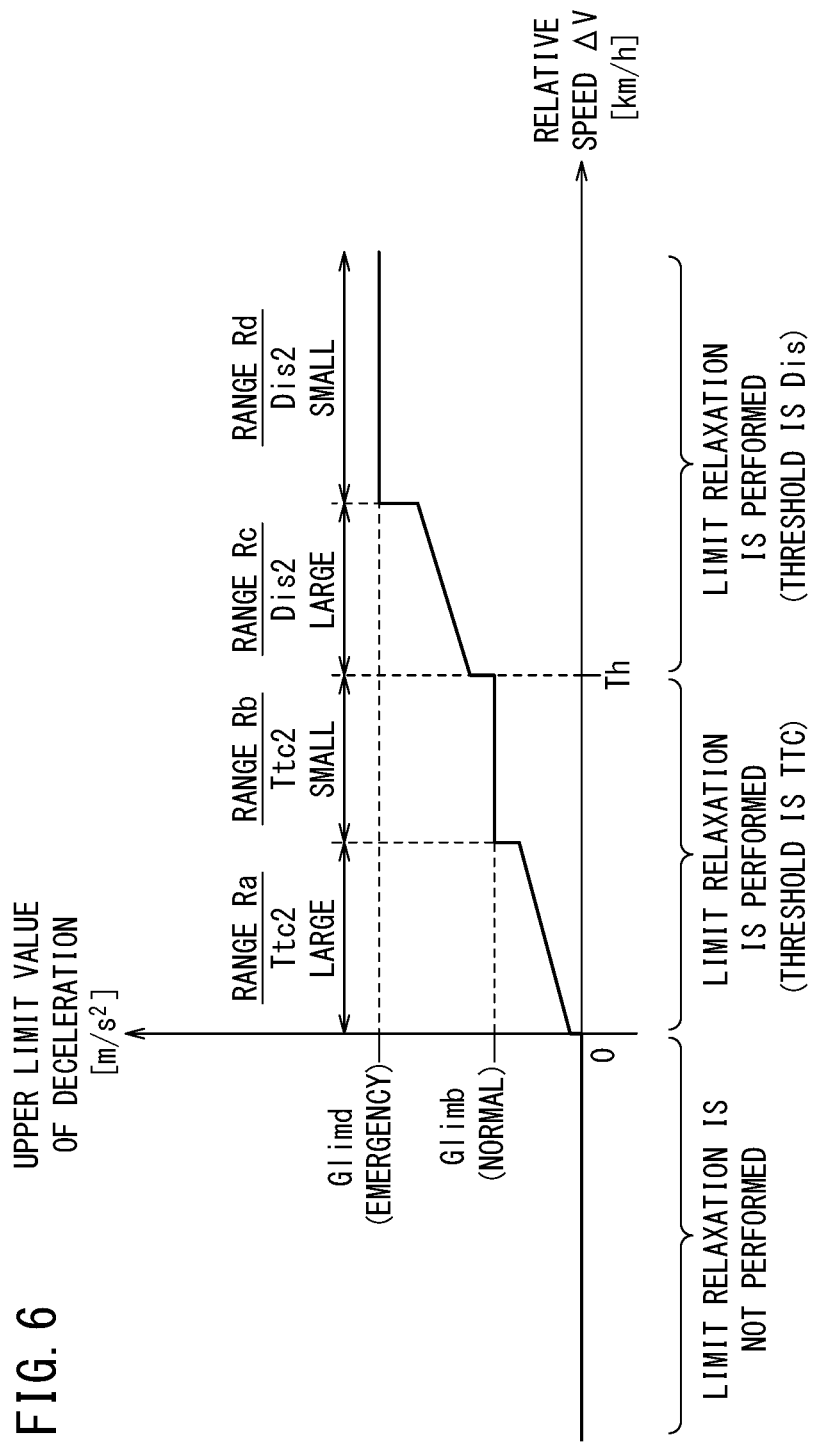
FIG. 6 illustrates one example of a limit characteristic of deceleration.

FIG. 6 illustrates one example of a limit characteristic of the deceleration. A horizontal axis of the graph expresses the relative speed $\Delta V$ (unit: km/h), and a vertical axis of the graph expresses an upper limit value of the deceleration (unit: $m/s^2$). Hereinafter, the deceleration is defined as an absolute value "without sign". As the value of the deceleration is larger, the variation of the speed (deceleration amount) per unit time is larger.

As shown in this drawing, the upper limit value of the deceleration varies in accordance with the ranges of [1] $\Delta V \leq 0$, [2] $0 < \Delta V \leq Th$, and [3] $\Delta V > Th$. Here, Th is a positive speed threshold (for example, Th=10 [km/h]). As described below, $\Delta V \leq 0$ corresponds to a range where limit relaxation of the deceleration "is not performed", and $\Delta V > 0$ corresponds to a range where the limit relaxation of the deceleration "is performed".

[1] If $\Delta V \leq 0$ is satisfied, that is, if the magnitude relation of "V0=V2" or "V0<V2" is satisfied, the upper limit value is set to a zero value (zero or value close to zero). Thus, the vehicle is not decelerated substantially.

As described above, if the relative speed $\Delta V$ is the zero value or a negative value, the deceleration limit unit 86 sets the upper limit value of the deceleration to the zero value. Thus, in a situation where the inter-vehicle distance Dis2 for the second other vehicle 122 becomes longer gradually, the following control in which the host vehicle 100 is not decelerated can be performed.

[2] If $0 < \Delta V \leq Th$ is satisfied, that is, if the magnitude relation of "V2<V0≤V2+Th" is satisfied, the upper limit value of the deceleration is determined by using the time-to-contact Ttc2. Here, the upper limit value has a characteristic of linearly increasing with respect to the relative speed $\Delta V$ in a range Ra where the time-to-contact Ttc2 is larger than a predetermined time threshold. On the other hand, in a range Rb where the time-to-contact Ttc2 is smaller than the predetermined time threshold, the upper limit value takes a designated value (climb; normal deceleration limit) that is larger than that in the case of the range Ra.

As described above, if the relative speed $\Delta V$ does not exceed a speed threshold Th, the deceleration limit unit 86 may determine the upper limit value of the deceleration by using at least the time-to-contact Ttc2 of the host vehicle 100 with respect to the second other vehicle 122. Especially, the upper limit value to be determined by the deceleration limit unit 86 may become relatively larger as the time-to-contact Ttc2 becomes shorter, and may become relatively smaller as the time-to-contact Ttc2 becomes longer. Therefore, in a case where the contact with th e second other vehicle 122 needs to be avoided, operation of large deceleration can be allowed, whereas in a case where there is a sufficient time before the contact with the second other vehicle 122, the unnecessary sudden deceleration operation can be suppressed.

[3] If $\Delta V > Th$ is satisfied, that is, if the magnitude relation of "V0>V2+Th" is satisfied, the upper limit value of the deceleration is determined by using the inter-vehicle distance Dis2. Here, the upper limit value has a characteristic of linearly increasing with respect to the relative speed $\Delta V$ in a range Rc where the inter-vehicle distance Dis2 is larger than a predetermined distance threshold. On the other hand, in a range Rd where the inter-vehicle distance Dis2 is smaller than the predetermined distance threshold, the upper limit value takes a designated value (Glimd) that is larger than that in the case of the range Rc. Note that Glimd corresponds to "deceleration limit in emergency", and the magnitude relation of Glimd>Glimb is satisfied.

Figure 7:
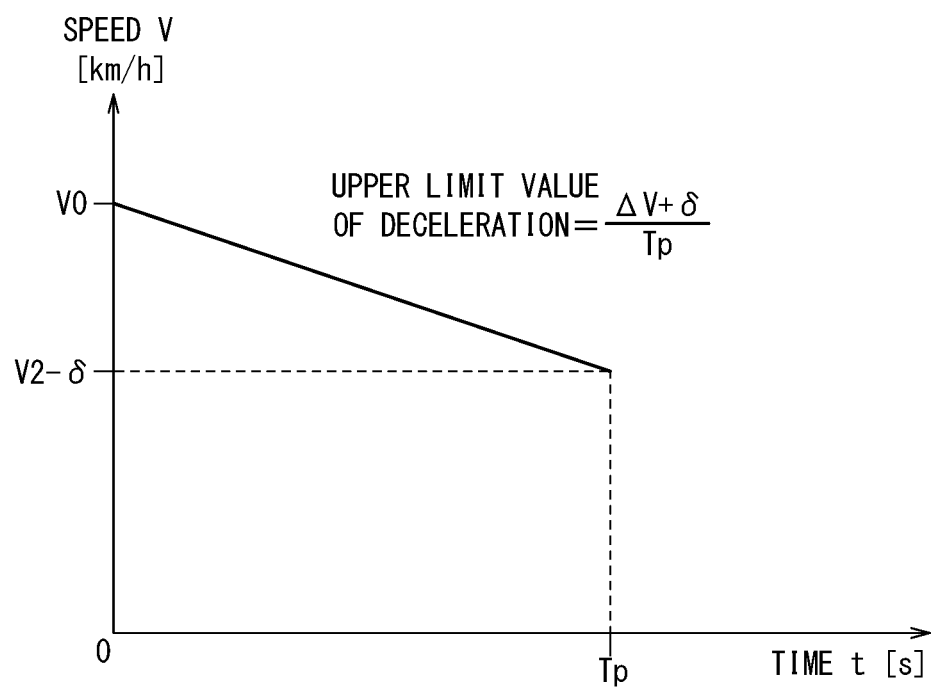
FIG. 7 shows a method for determining an upper limit value in ranges.

FIG. 7 shows a method for determining the upper limit value in the ranges Ra, Rc. This drawing corresponds to a graph of the target speed pattern of the host vehicle 100. A horizontal axis of the graph expresses time t (unit: s), and a vertical axis of the graph expresses the speed V of the host vehicle 100 (unit: km/h). This time t corresponds to elapsed time from a time point (t=0) when the external environment state detection unit 80 performs the detection.

This target speed pattern is expressed by a line segment that connects two points (0, V0), (Tp, V2−δ). Here, V0 is the current speed of the host vehicle 100, and V2 is the current speed of the second other vehicle 122. Moreover, Tp is estimated time (any positive value) and δ is a speed margin (for example, 5 km/h). The deceleration that achieves this pattern is (ΔV+δ)/Tp. Thus, this value is determined as the upper limit value.

As described above, if the relative speed ΔV does not exceed the speed threshold Th and the time-to-contact Ttc2 exceeds the time threshold, the deceleration limit unit 86 may determine, as the upper limit value, a designated value of the deceleration where the relative speed ΔV becomes a predetermined negative value (−δ) at a time point (t=Tp) when the estimated time Tp has elapsed. In a situation where the change of the inter-vehicle distance Dis2 for the second other vehicle 122 is relatively small and the time-to-contact Ttc2 is relatively long, the deceleration control can be performed smoothly in accordance with the speed V2 of the second other vehicle 122.

<STEP 3. Travel Control Step>

Thirdly, in the state where the deceleration limit unit 86 limits the deceleration, the travel control unit 60 continues the travel control of the host vehicle 100. As a result, the host vehicle 100 exhibits different travel behavior in accordance with the relative speed ΔV.

FIG. 8A illustrates the travel behavior of the host vehicle 100 in a situation of the cutting-in in the range Ra (FIG. 6). While decelerating at approximately constant deceleration in accordance with the target speed pattern in FIG. 7, the host vehicle 100 gradually increases the inter-vehicle distance for the second other vehicle 122. Then, at a time point when the second other vehicle 122 has changed the lane, the speed V of the host vehicle 100 has reached V2−δ.

Before and after the completion of the lane change, the travel control unit 60 changes an object (target) of the following control from the first other vehicle 121 to the second other vehicle 122, and starts the following control with respect to the second other vehicle 122. Thus, the host vehicle 100 can continue the following traveling smoothly in accordance with the speed V2 of the second other vehicle 122 without performing the unnecessary sudden deceleration operation.

FIG. 8B illustrates the travel behavior of the host vehicle 100 in the situation of the cutting-in in the range Rd (FIG. 6). The host vehicle 100 decelerates at large deceleration that does not exceed Glimd in accordance with the limit characteristic in FIG. 6. Thus, in a case where the contact with the second other vehicle 122 needs to be avoided, operation of large deceleration can be allowed.

Then, at the time point when the second other vehicle 122 has changed the lane, the inter-vehicle distance for the second other vehicle 122 can be secured sufficiently and the speed V of the host vehicle 100 has reached V3 (<V2). Before and after the completion of the lane change, the travel control unit 60 changes the object (target) of the following control from the first other vehicle 121 to the second other vehicle 122, and starts the following control with respect to the second other vehicle 122. Thus, the host vehicle 100 can continue the following traveling smoothly while avoiding the contact with the second other vehicle 122 in advance.

[Effect of Vehicle Control Device 10]

As described above, the vehicle control device 10 is the device that performs the travel control of the host vehicle 100 at least partially automatically, the device including: [1] the external environment state detection unit 80 configured to detect the state of the external environment of the host vehicle 100; [2] the travel control unit 60 configured to perform the following control with respect to the other vehicle that is detected ahead of the host vehicle 100; and [3] the deceleration limit unit 86 configured to limit the deceleration of the host vehicle 100 while the following control is performed, wherein [4] if the external environment state detection unit 80 has detected the first other vehicle 121 that is the object of the following control and the second other vehicle 122 that exhibits the travel behavior of cutting in between the first other vehicle 121 and the host vehicle 100, the deceleration limit unit 86 limits the deceleration differently depending on whether the relative speed ΔV of the host vehicle 100 with respect to the second other vehicle 122 exceeds the speed threshold Th that is the positive value.

The vehicle control method using the vehicle control device 10 includes: [1] a detection step of detecting the state of the external environment of the host vehicle 100; [2] a control step of performing the following control with respect to the other vehicle that is detected ahead of the host vehicle 100; and [3] a limiting step of limiting the deceleration of the host vehicle 100 in the following control, wherein [4] if the first other vehicle 121 that is the object of the following control and the second other vehicle 122 that exhibits the travel behavior of cutting in between the first other vehicle 121 and the host vehicle 100 are detected in the detection step, the deceleration is limited differently depending on whether the relative speed ΔV of the host vehicle 100 with respect to the second other vehicle 122 exceeds the speed threshold Th that is the positive value in the limiting step.

As described above, if the second other vehicle 122 exhibits the travel behavior of cutting in between the first other vehicle 121 and the host vehicle 100, the deceleration is limited differently depending on whether the relative speed ΔV exceeds the speed threshold Th. Therefore, in the case where the inter-vehicle distance Dis2 for the second other vehicle 122 becomes shorter gradually, the following control suitable for the travel behavior of the second other vehicle 122 (that is, cutting-in vehicle) can be performed.

[Supplement]

The present invention is not limited to the embodiment described above, and can be modified freely within the range not departing from the concept of the present invention. Alternatively, the configurations can be combined arbitrarily within the range where technical contradiction does not occur.

For example, the limit characteristic of the deceleration is not limited to that in the example in FIG. 6, and may have another characteristic curve. Specifically, the speed threshold Th, the designated values Glimb, Glimd, the speed margin δ, or the estimated time Tp may be an arbitrary fixed value or a variable value correlated with other information.

The invention claimed is:

1. A vehicle control device that performs travel control of a host vehicle at least partially automatically, the vehicle control device comprising:
    an external environment state detection unit configured to detect a state of an external environment of the host vehicle;
    a travel control unit configured to perform following control with respect to another vehicle that is detected ahead of the host vehicle by the external environment state detection unit; and
    a deceleration limit unit configured to determine an upper limit value of deceleration of the host vehicle while the travel control unit performs the following control,
    wherein if the external environment state detection unit has detected a first other vehicle that is an object of the following control and a second other vehicle that exhibits travel behavior of cutting in between the first other vehicle and the host vehicle, the deceleration limit unit determines an upper limit value of the deceleration differently depending on whether relative speed of the host vehicle with respect to the second other vehicle exceeds a speed threshold that is a positive value,
    wherein the upper limit value is constant at least in a part of a range equal to or lower than the speed threshold, and
    wherein the upper limit value in a range exceeding the speed threshold is greater than a maximum of the upper limit value in the range equal to or lower than the speed threshold.

2. The vehicle control device according to claim 1, wherein:
    if the relative speed does not exceed the speed threshold, the deceleration limit unit determines the upper limit value of the deceleration by using at least time-to-contact of the host vehicle with respect to the second other vehicle; and
    if the relative speed exceeds the speed threshold, the deceleration limit unit determines the upper limit value of the deceleration by using at least an inter-vehicle distance between the second other vehicle and the host vehicle.

3. The vehicle control device according to claim 1, wherein if the relative speed does not exceed the speed threshold and the time-to-contact exceeds a time threshold, the deceleration limit unit determines, as the upper limit value, a designed value of the deceleration where the relative speed becomes a predetermined negative value at a time point when estimated time has elapsed.

4. The vehicle control device according to claim 1, wherein if the relative speed is a zero value or a negative value, the deceleration limit unit determines the zero value as the upper limit value of the deceleration.

5. The vehicle control device according to claim 1, wherein in a certain range where the relative speed does not exceed the speed threshold that is the positive value, the upper limit value is constant, and in a range lower than the certain range, the upper limit is lowered as the relative speed decreases.

6. The vehicle control device according to claim 5, wherein in the certain range, time-to-contact of the host vehicle with respect to the second other vehicle is larger than a predetermined time threshold.

* * * * *